US012518893B2

(12) United States Patent
Gandini et al.

(10) Patent No.: US 12,518,893 B2
(45) Date of Patent: Jan. 6, 2026

(54) POWER OR DATA TRANSMISSION CABLE WITH METALLIC WATER BARRIER AND PROCESS FOR MANUFACTURING SUCH A CABLE

(71) Applicant: Prysmian S.p.A., Milan (IT)

(72) Inventors: Marina Gandini, Milan (IT); Enrico Maria Consonni, Milan (IT); Giovanni Pozzati, Milan (IT); Massimo Tawfilas, Milan (IT)

(73) Assignee: Prysmian S.p.A., Milan (IT)

( * ) Notice: Subject to any disclaimer, the term of this patent is extended or adjusted under 35 U.S.C. 154(b) by 78 days.

(21) Appl. No.: 18/296,677

(22) Filed: Apr. 6, 2023

(65) Prior Publication Data

US 2023/0326626 A1 Oct. 12, 2023

(30) Foreign Application Priority Data

Apr. 7, 2022 (IT) ........................ 102022000006962

(51) Int. Cl.
*H01B 7/14* (2006.01)
*H01B 1/02* (2006.01)
(Continued)

(52) U.S. Cl.
CPC ............. *H01B 7/2825* (2013.01); *H01B 1/02* (2013.01); *H01B 7/14* (2013.01); *H01B 9/006* (2013.01);
(Continued)

(58) Field of Classification Search
CPC ... H01B 1/02; H01B 7/14; H01B 7/18; H01B 7/2825; H01B 9/006; H01B 9/02; H01B 9/04; H01B 11/18; H01B 13/06; H01B 13/10; H01B 13/22; H01B 13/26; H01B 13/2613
(Continued)

(56) References Cited

U.S. PATENT DOCUMENTS 3,340,353 A * 9/1967 Mildner ............... H01B 7/2825 174/105 R
4,100,003 A * 7/1978 Trusch ................. H01B 13/262 156/461
(Continued)

FOREIGN PATENT DOCUMENTS

CA 1282520 C * 4/1991 ............... H01R 4/04
DE 1540430 A1 1/1970
(Continued)

OTHER PUBLICATIONS

Kim, J. et al, "Copper nanoparticle paste on different metallic substrates for low temperature bonded interconnection", 2017, 19th Electronics Packaging Technology Conference, 4 pages (published in IEEE Xplore on Feb. 1, 2018).
(Continued)

*Primary Examiner* — William H. Mayo, III
(74) *Attorney, Agent, or Firm* — Slater Matsil LLP

(57) ABSTRACT

A transmission cable includes a cable core extending along a longitudinal direction; a water barrier in form of a metallic foil folded around the cable core along the longitudinal direction with overlapped edges. The overlapped edges is bonded to one another by a bonding layer made of an inorganic material.

19 Claims, 4 Drawing Sheets

(51) Int. Cl.
*H01B 7/282* (2006.01)
*H01B 9/00* (2006.01)
*H01B 11/18* (2006.01)
*H01B 13/26* (2006.01)

(52) U.S. Cl.
CPC ......... *H01B 11/18* (2013.01); *H01B 13/2613* (2013.01)

(58) Field of Classification Search
USPC ............ 174/36, 102 D, 102 R, 106 SC, 107, 174/119 R, 119 C; 428/119 R, 119 C, 428/389, 910, 913; 156/54, 56, 61, 85, 156/86, 201, 212, 244.12, 296, 365, 461, 156/466, 308.6, 308.8
See application file for complete search history.

(56) References Cited

U.S. PATENT DOCUMENTS

| | | | | |
|---|---|---|---|---|
| 4,221,926 A * | 9/1980 | Schneider | H01B 7/2825 | 156/212 |
| 4,360,395 A * | 11/1982 | Suzuki | H01B 13/266 | 156/461 |
| 4,360,704 A | 11/1982 | Madry | | |
| 4,454,379 A * | 6/1984 | Cleveland | H01B 7/2825 | 174/106 SC |
| 4,595,431 A * | 6/1986 | Bohannon, Jr. | H01B 13/10 | 174/102 C |
| 4,622,092 A * | 11/1986 | Bohannon, Jr. | H01B 7/285 | 156/48 |
| 6,064,000 A * | 5/2000 | Kim | H01R 13/6592 | 174/109 |
| 9,058,917 B2 * | 6/2015 | Koelblin | H01B 7/2825 | |
| 9,691,524 B2 | 6/2017 | Hobson | | |
| 11,031,704 B2 | 6/2021 | Stoltenberg et al. | | |
| 2016/0276066 A1 * | 9/2016 | Perego | H01B 9/02 | |
| 2019/0036234 A1 | 1/2019 | Stoltenberg et al. | | |
| 2021/0082599 A1 * | 3/2021 | Pozzati | H01B 7/202 | |

FOREIGN PATENT DOCUMENTS

| | | | |
|---|---|---|---|
| EP | 3069354 B1 | 1/2018 | |
| EP | 3494184 B1 | 1/2021 | |
| WO | WO-2014206474 A1 * | 12/2014 | C23C 4/06 |

OTHER PUBLICATIONS

Wang, X. et al., "Anti-oxidative copper nanoparticle paste for Cu—Cu bonding at low temperature in air", Journal of Materials Science: Materials in Electronics vol. 33, pp. 817-827 (2022), published Online Nov. 23, 2021.

* cited by examiner

POWER OR DATA TRANSMISSION CABLE WITH METALLIC WATER BARRIER AND PROCESS FOR MANUFACTURING SUCH A CABLE

CROSS-REFERENCE TO RELATED APPLICATIONS

This application claims priority to Italian Application No. 102022000006962, filed on Apr. 7, 2022, which application is hereby incorporated herein by reference.

TECHNICAL FIELD

The present disclosure refers to a power or data transmission cable with water barrier particularly but not exclusively useful for underwater or underground deployment. The present disclosure refers also to a process for manufacturing such a power or data transmission cable. For example, such a power cable can be a high voltage power cable.

BACKGROUND

In this specification, the expression “high voltage” (HV) indicates voltages equal or greater than 30 KV.

Typically, a power cable, particularly a HV power cable, includes at least one cable core usually formed by an electrically conductive metal conductor covered by an insulation system. The insulation system can be sequentially formed by an inner polymeric semiconductive layer, an intermediate polymeric insulating layer, and an outer polymeric semiconductive layer. The insulation system is surrounded by one or more protective layers.

When a power cable is to be installed in a wet or potentially wet environment, such as underwater or underground, the cable core should be protected from moisture or water penetration that may lead to electrical breakdown. For this purpose, submarine or underground power cable typically include a water barrier surrounding the cable core/s of the power cable so as to block water penetration during installation and operation of the cable.

The water barrier can be made as an extruded lead sheath. The lead water barriers have the advantages that the lead can be extruded on to the cable core and that they are reliable over long distances. However, the provision of a lead water barrier is getting less and less popular because of its substantial weight, its poor environmental sustainability and its poor fatigue resistance that makes the cable not very compatible for dynamic application like the connection of floating platforms.

For these reasons, cables provided with water barrier made of different metal like aluminum or copper are more and more in use. However, a water barrier made in aluminum is not an appealing solution for submarine applications because of its tendency to the corrosion that reduces its long-term reliability.

Known water barriers made of aluminum or copper can be made in form of a foil longitudinally folded around the cable core with welded edges or overlapped and glued edges (though copper and aluminum can be extruded too, their extrusion temperatures may harm other portions of the cable). The foil may have a thickness comprised between 0.1 mm and 2 mm.

When the water barrier is made by folding a metal foil and gluing its overlapped edges, water/moisture penetration may occur at the overlapping area as the gluing is typically made by a polymeric adhesive which, especially in the case of underwater application, may be or become water pervious.

Due to the potential water/moisture penetration through the gluing, nowadays power cables are generally designed for a voltage up to 72.5 kV and preferably provided with an insulating system with tree-retardant property.

When the water barrier is made by folding a metal foil and welding its juxtaposed edge to create a tube, the welding temperature may damage the cable underlying layer/s due to high melting temperature (e.g. about 1080° C. when copper is used), especially when the metal foil is 0.4-1.0 mm-thick. Thus, the tube to be welded should have a diameter suitably greater than that of the underlying layer, and should be drawn down to join such underlying layer after welding. But this procedure may harden the metal more than the welding which may become a weak point of the water barrier. Moreover, depending on the diameter and the thickness of the metallic water barrier and depending on other variables related to the particular application, e.g. the radii of curvature and installation conditions, and the cable manufacturing, it can be necessary to implement a corrugated water barrier to provide more flexibility to the power cable with respect to a flat water barrier.

Moreover, a metal foil having a thickness from 0.3 mm, but thinner than e.g., 0.8 mm may be folded and its overlapped edges thermosealed at low temperature, but the thermosealing can be not totally hermetic.

EP3069354 relates to cables for underground and submarine use comprising a water barrier being a wrapped foil having edges overlapped and fastened by a bonding agent, the overlapped edges and the bonding agent forming a bonding seam; and a thermal sprayed metal coating on the bonding seam. The fastening of the overlapped edges to each other with a bonding agent preferably comprises deposing a layer of polymeric adhesive resin between the overlapped edges.

Kim J. et al, “Copper nanoparticle paste on different metallic substrates for low temperature bonded interconnection,” 2017, 19th Electronics Packaging Technology Conference deals with copper nanoparticles paste as a joining material between metallized component and metallized substrate. A bonding strength lower than 15 MPa is shown for Cu-paste-Cu. In laboratory experiments, it is important to have acid precleaning before the nano Cu sintering process to obtain good bonding properties between the nano Cu paste and Cu surfaces. However, acid pre-cleaning may not be viable in the actual manufacturing process.

Wang X. et al., “Anti-oxidative copper nanoparticle paste for Cu-Cu bonding at low temperature in air,” Journal of Materials Science: Materials in Electronics volume 33, pages 817-827 (2022) deals with copper nanoparticles with average diameter of 100 nm which were first simply treated with lactic acid to remove the surface oxide and the resulting cupric lactate on the surface can prevent the oxidation of copper. Then the nanoparticles were mixed with 3-dimethylamino-1,2-propanediol to prepare an anti-oxidative copper paste. The paste can be used for Cu-Cu thermocompression bonding at low temperature in air. The shear strength of the Cu/paste/Cu samples reached 28.7±1.6 MPa after thermocompression at 225° C. under 8 MPa in air. The oxidation of the copper nanoparticles might restrict the potential of this paste for using at higher bonding temperature in air.

EP3494184 relates to an ink composition comprising copper nanoparticles, at least one copper-oxidizing agent, and copper hydride (CuH). The copper-oxidizing agent may be selected from organic acids, inorganic acids and anhydrides, alcohols, aldehydes, and hydroxyamines.

U.S. Pat. No. 11,031,704 relates to cables and high reliability cable connections for high power electronics systems. A cable can include: a plurality of cable strands forming a void space between the plurality of cable strands; and an adhesive paste including a plurality of metallic nanoparticles disposed in the void space. The plurality of cable strands is copper and the plurality of metallic nanoparticles is copper.

SUMMARY

The Applicant faced the problem of providing a power or data transmission cable, particularly for submarine applications, capable of withstanding water penetration.

The Applicant considered to make a water barrier, for example a copper barrier, by longitudinally folding a metal foil, for example a copper foil, with overlapped glued edges since this involve a simple manufacturing process without the risk of hardening the copper.

In order to glue the overlapped edges and to assure a protection against water/moisture penetration greater than that of the known polymeric adhesive, the Applicant considered to use as a bonding agent between the overlapped edges a solder paste having a sintering temperature lower than the melting temperature of the metal constituting the foil and providing a bonding layer essentially consisting of inorganic material.

Indeed, the Applicant found that after having deposed this solder paste on at least one of the edge of the longitudinally folded foil, then having overlapped the edges and having sintered the solder paste, such a solder paste yields a bonding layer that binds the overlapped edges to each other with a strength suitable for withstanding the stresses commonly bore by a cable, even a bulky power cable for submarine use.

The Applicant experienced that the obtained bonding layer is a substantially continuous layer that assures the protection against water and/or moisture penetration and a suitable mechanical adhesion.

Moreover, as the sintering temperature is much lower than the melting temperature of the metal constituting the folded foil, the risk of damaging the cable core during the heating step is very low.

Therefore, according to a first aspect, the present disclosure relates to a power or data transmission cable comprising a cable core extending along a longitudinal direction; a water barrier in form of a metallic foil folded around the cable core along the longitudinal direction with overlapped edges, the overlapped edges being bonded one another by a bonding layer made of inorganic material.

In the present description and claims as "cable core" is meant a power or data transmission conductor surrounded by protecting layers. In the case of a power cable, the cable core comprises an electric conductor surrounded by an electrically insulating layer or by an electrically insulating system comprising an inner semi-conductive layer arranged in a radially outer position with respect to the conductor; an insulating layer arranged in a radially outer position with respect to the inner semi-conductive layer; generally, an outer semi-conductive layer arranged in a radially outer position with respect to the insulating layer; and a metal screen arranged in a radially outer position with respect to the outer semi-conductive layer. A bedding layer, for example in polymer material, may be present in radially outer position with respect to the metal screen. When the power cable comprises more than one electric conductors, its cable core may also comprise a filler embedding all the electric conductors and the layers surrounding them.

In the case of a data transmission cable, when the transmission is made by an electric conductor, the definition above applies; when the transmission is an optical one, the cable core may comprise an optical waveguide surrounded by one or more polymeric coatings; and, optionally, a polymeric buffer. The optionally buffered optical waveguide may be surrounded by one or more protective layers.

In an embodiment, the bonding layer is made of at least one metal, for example the same metal of the metallic foil.

In an embodiment, the bonding layer is made of ceramic material.

In an embodiment the metallic foil is made of copper and the bonding layer is made of copper or an alloy thereof.

The bonding layer of the present cable is made of inorganic material in that it might comprise residues of organic materials, said residues being possibly present in a concentration of parts per million (ppm), if any.

In an embodiment the thickness of the metallic foil is comprised between 0.1 mm and 2 mm.

According to a further aspect, the present disclosure relates to a process for manufacturing a power or data transmission cable comprising: providing a power or data transmission cable core extending along a longitudinal direction; providing a metallic foil made of a metal having a melting temperature; folding the metallic foil around the power or data transmission cable core along the longitudinal direction so as to approach two longitudinal edges of the metal foil; applying a solder paste on at least one longitudinal edge, said solder paste having a sintering temperature lower than the melting temperature of the metal constituting the metallic foil; overlapping the two longitudinal edges of the metal foil so as to bring them in contact via the solder paste; heating at least the overlapped longitudinal edges up to the sintering temperature of the solder paste and optionally applying a pressure so that the solder paste sinters and forms a bonding layer binding the edges and yielding a water barrier.

In the present description and claims, as "solder paste" is meant a dispersion of inorganic particles in an organic carrier (e.g. a flux paste) wherein, under suitable conditions like a given heating, the inorganic particles coalesce to form a permanent bond while the organic carrier evaporates. A solder paste according to the present disclosure differs from a glue in that the latter is mainly, if not totally, based on organic components, and form a bond made of organic components.

In an embodiment, the solder paste has a viscosity comprised between 10,00 and 100,000 Cps at room temperature, for example between 15,000 and 50,000 Cps.

In an embodiment, the metallic foil has a width and the overlapping of the two longitudinal edges is of from 5% to 30% of the metallic foil width.

In an embodiment, the step of heating involve the whole metallic foil.

In an embodiment, the pressure optionally applied during the heating step may range between 0.1 and 10 MPa.

For the purpose of the present description and of the claims that follow, except where otherwise indicated, all numbers expressing amounts, quantities, percentages, and so forth, are to be understood as being modified in all instances by the term "about." Also, all ranges include any combination of the maximum and minimum points disclosed and include any intermediate ranges therein, which may or may not be specifically enumerated herein.

Also, the terms "a" and "an" are employed to describe elements and components of the disclosure. This is done merely for convenience and to give a general sense of the disclosure. This description should be read to include one or at least one, and the singular also includes the plural unless it is obvious that it is meant otherwise.

As "insulating layer" it is meant a layer made of a material having a conductivity comprised between $10^{-16}$ and $10^{-14}$ S/m.

As "semiconductive layer" it is meant a layer made of a material having a conductivity comprised between $10^{-1}$ and 10 S/m.

The present disclosure, in at least one of the aforementioned aspects, can be implemented according to one or more of the present embodiments, optionally combined together.

BRIEF DESCRIPTION OF THE DRAWINGS

Further characteristics will be apparent from the detailed description given hereinafter with reference to the accompanying drawings, in which.

DETAILED DESCRIPTION OF ILLUSTRATIVE EMBODIMENTS

With reference to the figures, a power cable according to the present disclosure is schematically represented.

Figure 1:
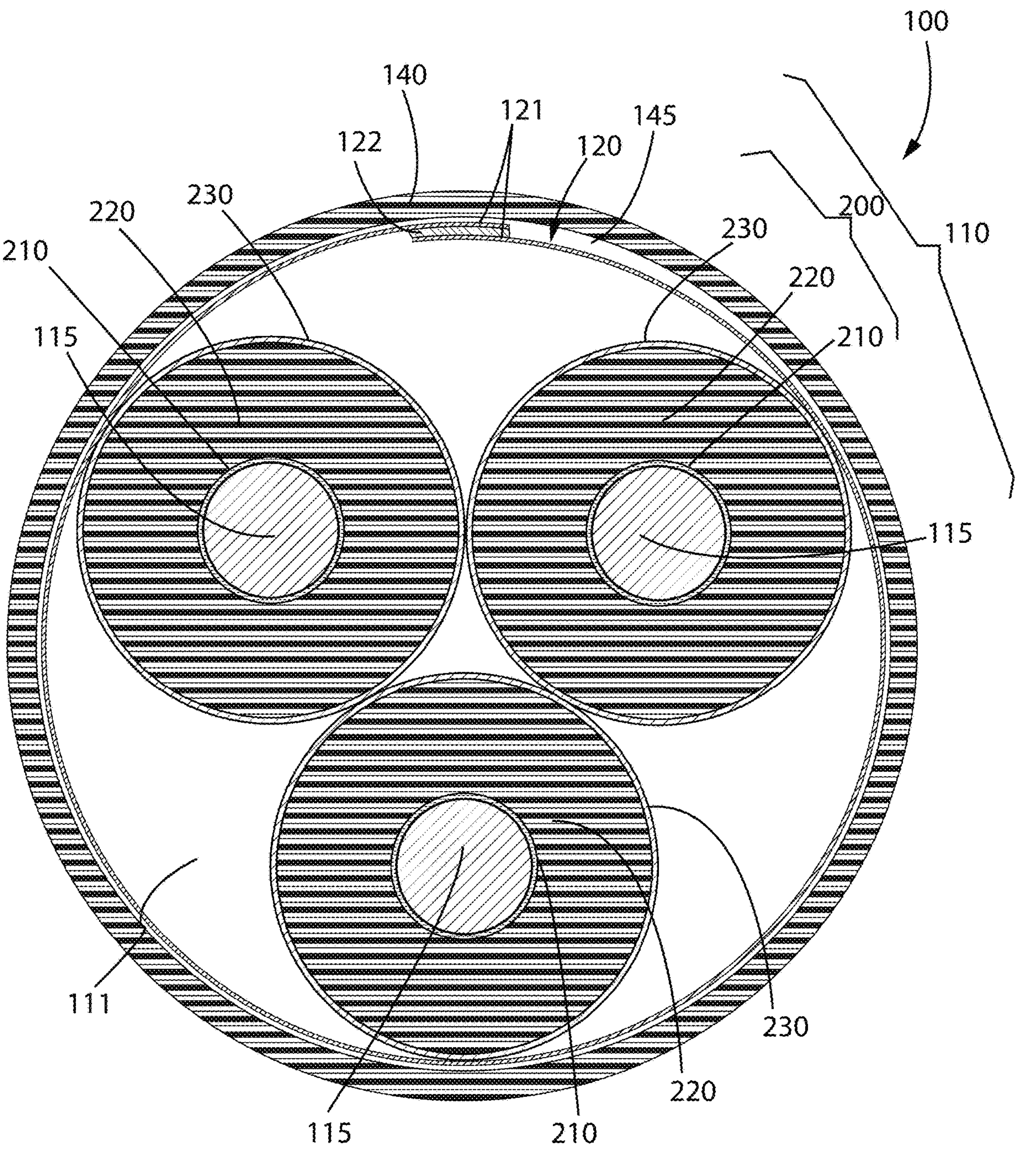
FIGS. 1 is a schematic section view of a multi-core power cable according to a first embodiment of the present disclosure.

The power cable 100 of FIG. 1 comprises a cable core no comprising, in turn, three electric conductors 115 each surrounded by a polymeric insulation system 200. Each polymeric insulation system 200 is sequentially formed by an inner polymeric semiconductive layer 210, an intermediate polymeric insulating layer 220, and an outer polymeric semiconductive layer 230. A metallic screen (not illustrated) may surround each outer polymeric semiconductive layer 230.

The power cable 100 also comprises a filler in surrounding the three electric conductors 115 and relevant polymeric insulation systems 200.

The power cable 100 comprises a water barrier 120 in form of a metal tube surrounding the cable core 110. In particular, the water barrier 120 is made in form of a metallic foil folded around the cable core no along the longitudinal direction with overlapped edges 121 bonded by a bonding layer 122 according to the present disclosure. Edges 121 may be overlapped of about 15% of the metallic foil width.

In a non-illustrated embodiment, a water barrier 120 is provided around each of the three cable cores 110 of the cable 100 of FIG. 1. In this case, a further water barrier 120 as illustrated in FIG. 1 may be optionally provided.

The power cable 100 further comprise a polymeric sheath 140 around the water barrier 120. An adhesive layer 145 can be interposed between the water barrier 120 and the polymeric sheath 140 in order to ensure the adhesion of the polymeric sheath 140 and the water barrier 120.

Figure 2:
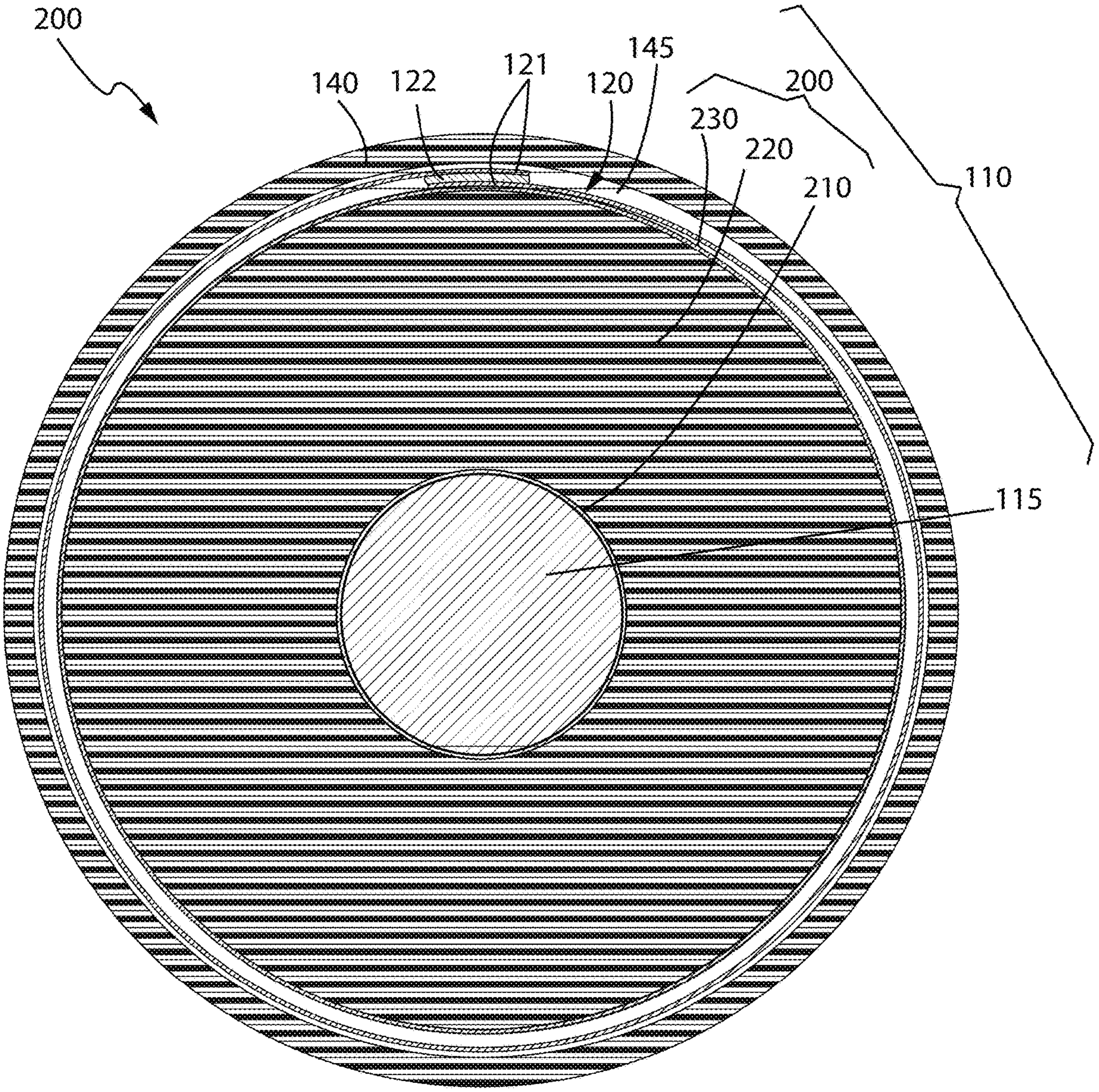
FIGS. 2 is a schematic section view of a single core power cable according to a second embodiment of the present disclosure.

In the embodiment of FIG. 2, the power cable 100 comprises a single cable core 110. All the numbers of this Figure refer to the same elements as from FIG. 1.

According to the present disclosure, the overlapped edges 121 are bonded to one another by the bonding layer 122 that is made of inorganic material.

The bonding layer 122 can be made of at least one metal or of a ceramic material.

If the bonding layer 122 is metallic, the water barrier 120 can act also as a metallic screen.

The water barrier 120 can be made of a metal selected from aluminum, copper or composites and alloys containing at least one of this metal.

In an embodiment, the bonding layer 122 can be made of substantially the same metal of the water barrier 120.

In an embodiment, the water barrier of the present cable is made of copper. A suitable copper for the water barrier should be a high purity one with a copper content greater than 90% and a low oxygen content, for example, from 50 ppm to 15 ppm or less. Copper alloys may also be suitable for the water barrier of the present disclosure.

A bonding layer suitable for the cable of the present disclosure is obtained through the sintering of a solder paste. The solder paste can have a sintering temperature lower than the melting temperature of the metal constituting the metallic foil.

In case the metallic foil is made of copper, the solder paste can be a copper-containing paste.

For example, in case the solder paste is a copper-containing paste, the sintering temperature is around 250-300° C. that is much lower than the melting temperature of the copper (1080° C.). In this way, the heating of at least the edges of the metallic foil is such that the underlying polymeric layer/s are not reached by potentially harmful temperatures.

An example of a copper paste that can be used is the solder paste described in EP3494184.

The bonding layer resulting from the sintering process of the solder paste is made of inorganic material, for example, it is substantially made of copper, though it can comprise residue of organic material contained in the solder paste before sintering.

The power or data transmission cable of the present disclosure can be manufactured by a process that will be described in the following.

Figure 3A:
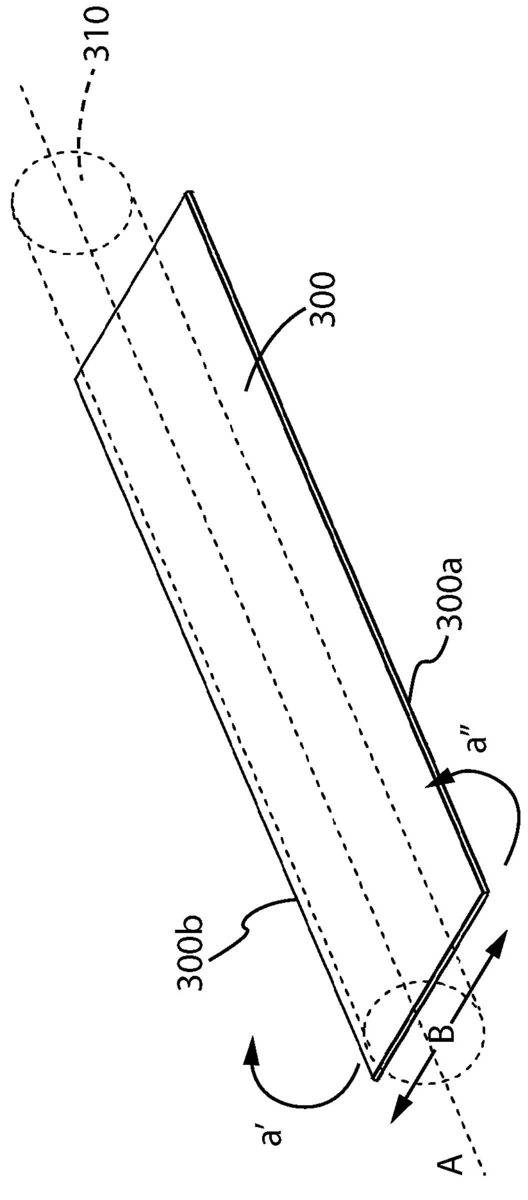
FIGS. 3A-3B illustrate a portion of a cable during phases of the process for manufacturing the power or data transmission cable of the present disclosure.
Figure 3C:
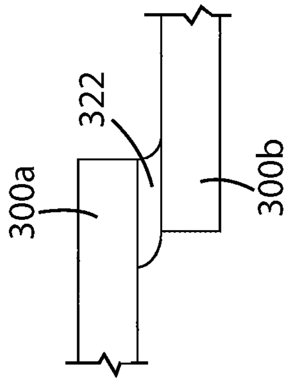
FIG. 3C is a cross-sectional view of a particular of the power or data transmission cable of FIG. 3B.
Figure 3B:
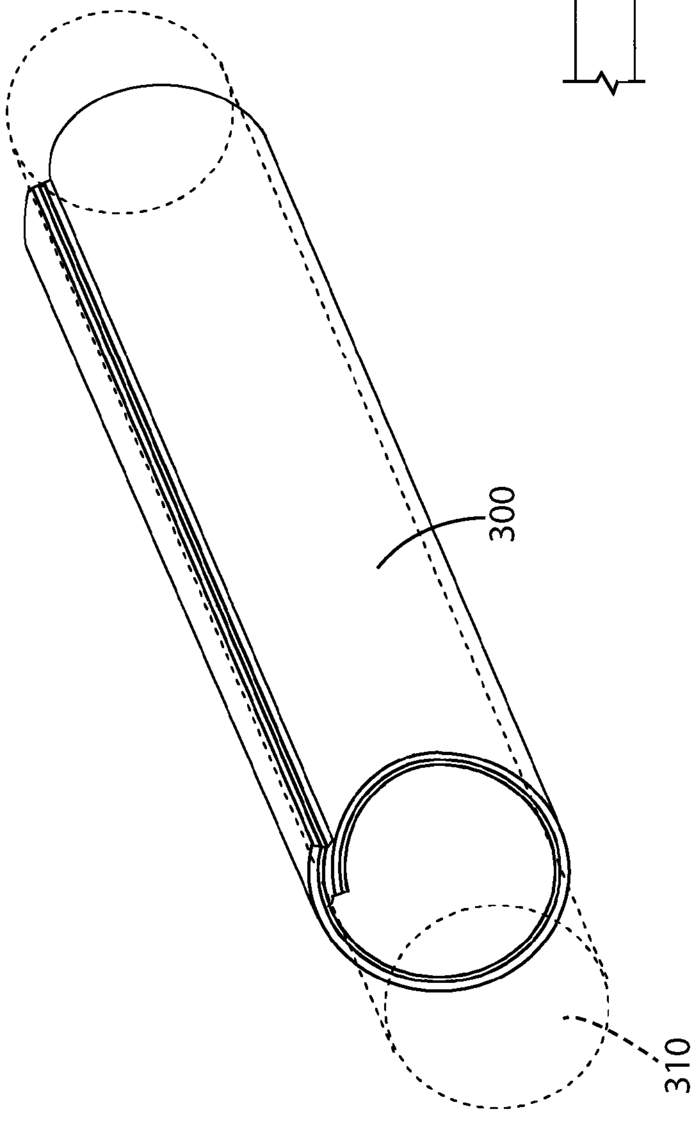

For the sake of simplicity the process will be described with reference with reference to FIGS. 3*a*-3*c*.

The process comprises the step of providing a power or data transmitting cable core 310 extending along a longitudinal direction A. The manufacturing process of the cable core 310 is not described since it is known per-se. In an embodiment, the provision of the cable core 310 provides for advancing the cable core 310 from its manufacturing apparatus in a continuous manufacturing line.

The process of the disclosure also comprises the step of providing the metallic foil 300 having a width B, and folding such foil around the cable core 310 along the longitudinal direction A in the direction of the arrows a', a" so as to approach one another the two metal foil longitudinal edges 300*a*, 300*b*. The provision of the metallic foil 300 and the folding thereof may be carried out in a continuous manner in the manufacturing line.

For example, the metallic foil has a thickness comprised between 0.1 mm and 2 mm.

Then, the process of the disclosure comprises the step of applying the solder paste on at least one of the edges 300*a*, 300*b* to be overlapped, for example in a continuous manner.

The application of the solder paste may be carried out for example by an injector positioned over the cable core 310 and the folded metallic foil 300, the injector dropping the paste on at least one of the edges 300*a*, 300*b* to be overlapped.

After the application of the solder paste the process comprises the step of overlapping the longitudinal edges 300*a*, 300*b* and put them into contact via the solder paste. Edges may be overlapped of about 15% of the metallic foil width B. Then a heating step of at least the overlapped edges of the folded metallic foil is performed up to the sintering temperature of the solder paste, optionally applying a pressure, so that the solder paste sinters and forms a bonding layer 322, thus realizing the water barrier.

The bonding layer of the present cable is capable of binding the edges of the water barrier in compliance to TB446, Cigrè, 2011 (ISBN: 978-2-85873-135-0). The bonding layer has a strength suitable to bear the stresses commonly exerted on the cable during its deployment and use, without affecting its integrity and performance against the water penetration even at the pressures of a submarine application (e.g. greater than 100 bar).

The optional adhesive layer and the polymeric sheath may be sequentially extruded around the water barrier.

What is claimed is:

1. A power or data transmission cable comprising:

a cable core extending along a longitudinal direction; and a water barrier in form of a metallic foil folded around the cable core along the longitudinal direction with overlapped edges, the water barrier being made of copper or an alloy thereof, the copper or the alloy thereof being a high purity copper with a copper content greater than 90%, the overlapped edges being bonded to one another by a bonding layer made of substantially the same metal of the water barrier, the bonding layer being disposed between the overlapped edges of the metallic foil.

2. The power or data transmission cable according to claim 1, wherein the thickness of the metallic foil is between 0.1 mm and 2 mm.

3. The power or data transmission cable according to claim 1, wherein the cable is a power transmission cable.

4. The power or data transmission cable according to claim 1, wherein the cable is a data transmission cable.

5. The power or data transmission cable according to claim 1, wherein the cable is a power and data transmission cable.

6. The power or data transmission cable according to claim 1, wherein the high purity copper has a low oxygen content from 50 ppm to 15 ppm or less.

7. The power or data transmission cable according to claim 1, wherein the cable core comprises three electric conductors, each electric conductor of the three electric conductors being surrounded by a respective polymeric insulation system.

8. A process for manufacturing a power or data transmission cable comprising:

providing a transmission cable core extending along a longitudinal direction;

providing a metallic foil made of a metal having a melting temperature, the metallic foil comprising two longitudinal edges;

folding the metallic foil around the transmission cable core along the longitudinal direction;

applying a solder paste on at least one of the two longitudinal edges, the solder paste having a sintering temperature lower than the melting temperature of the metal of the metallic foil, and the solder paste having a viscosity between 10,000 and 100,000 Cps at room temperature;

overlapping the two longitudinal edges of the metal foil so as to bring them in contact via the solder paste; and heating at least the overlapped longitudinal edges up to the sintering temperature of the solder paste to form a bonding layer binding the longitudinal edges and yielding a water barrier.

9. The process according to claim 8, wherein the metallic foil has a width and the overlapping of the two longitudinal edges is from 5% to 30% of the width of the metallic foil.

10. The process according to claim 8, wherein heating at least the overlapped longitudinal edges comprises heating all of the metallic foil.

11. The process according to claim 8, further comprising applying a pressure so that the solder paste sinters and forms the bonding layer.

12. The process according to claim 11, wherein the pressure is applied during the heating ranges between 0.1 and 10 MPa.

13. The process according to claim 8, wherein the cable is a power transmission cable.

14. The process according to claim 8, wherein the cable is a data transmission cable.

15. The process according to claim 8, wherein the cable is a power and data transmission cable.

16. A process for manufacturing a power or data transmission cable comprising:

providing a transmission cable core extending along a longitudinal direction;

providing a metallic foil made of a metal having a melting temperature, the metallic foil comprising two longitudinal edges and being made of copper;

folding the metallic foil around the transmission cable core along the longitudinal direction;

applying a solder paste on at least one of the two longitudinal edges, the solder paste having a sintering temperature lower than the melting temperature of the metal of the metallic foil and being made of copper or an alloy thereof, and the solder paste having a viscosity between 10,000 and 100,000 Cps at room temperature;

overlapping the two longitudinal edges of the metal foil so as to bring them in contact via the solder paste; and heating at least the overlapped longitudinal edges up to the sintering temperature of the solder paste to form a bonding layer binding the longitudinal edges and yielding a water barrier.

17. The process according to claim 16, wherein the metallic foil has a width and the overlapping of the two longitudinal edges is from 5% to 30% of the width of the metallic foil.

18. The process according to claim 16, wherein heating at least the overlapped longitudinal edges comprises heating all of the metallic foil.

19. The process according to claim 16, further comprising applying a pressure so that the solder paste sinters and forms the bonding layer.

* * * * *